US011608850B2

(12) United States Patent
von Wilcke et al.

(10) Patent No.: US 11,608,850 B2
(45) Date of Patent: Mar. 21, 2023

(54) CONNECTOR FOR BUTT-CONNECTING TWO COMPONENTS

(71) Applicant: Häfele GmbH & Co KG, Nagold (DE)

(72) Inventors: Michael von Wilcke, Birkenwerder (DE); Peer Leistert, Schoeneiche (DE); Gerd Sawatzki, Rauen (DE); Gunter Nitschmann, Pfalzgrafenweiler (DE)

(73) Assignee: Häfele GmbH & Co KG, Nagold (DE)

( * ) Notice: Subject to any disclaimer, the term of this patent is extended or adjusted under 35 U.S.C. 154(b) by 386 days.

(21) Appl. No.: 16/832,792

(22) Filed: Mar. 27, 2020

(65) Prior Publication Data
US 2020/0224704 A1 Jul. 16, 2020

Related U.S. Application Data

(63) Continuation of application No. PCT/EP2018/073602, filed on Sep. 3, 2018.

(30) Foreign Application Priority Data

Oct. 5, 2017 (DE) ............ 20 2017 106 045.4

(51) Int. Cl.
*F16B 33/02* (2006.01)
*F16B 12/24* (2006.01)

(52) U.S. Cl.
CPC ............ *F16B 33/02* (2013.01); *F16B 12/24* (2013.01)

(58) Field of Classification Search
CPC ........ F16B 33/02; F16B 12/24; F16B 13/128; F16B 12/20; F16B 12/26; F16B 21/082; F16B 5/0024
See application file for complete search history.

(56) References Cited

U.S. PATENT DOCUMENTS 3,229,335 A * 1/1966 Thome .................. F16B 12/46
52/766
3,777,052 A * 12/1973 Fegen ................... F16B 21/082
24/336

(Continued)

FOREIGN PATENT DOCUMENTS

DE 200 07 389 U1 10/2000
DE 20 2014 002242 U1 6/2014

(Continued)

*Primary Examiner* — Patrick J Maestri
(74) *Attorney, Agent, or Firm* — Orbit IP

(57) ABSTRACT

A connector for butt-connecting two chipboard components having two connector parts, which, mutually rotated through 90°, can be pushed together, into one another, into a locked assembly position and are in the form of U-shaped brackets having two outer bracket arms, which respectively have a rear plug-in portion for insertion into a circular drill hole of one component and an expandable front plug-in portion, forming the free bracket end, for insertion into a circular drill hole of the other component. A middle bracket arm is for expansion of the two front plug-in portions of the respectively other bracket in the assembly position. At least one locking portion for the mutual locking of the two brackets in the assembly position is provided. The outer sides of the rear plug-in portions are each configured, at least approximately, as partial lateral surfaces of the same circular cylinder.

13 Claims, 3 Drawing Sheets

(56) References Cited

U.S. PATENT DOCUMENTS

| | | | | |
|---|---|---|---|---|
| 3,954,345 A | * | 5/1976 | Morris | F16B 5/0024 |
| | | | | 403/297 |
| 4,093,389 A | * | 6/1978 | Wibrow | F16B 19/10 |
| | | | | 403/280 |
| 4,454,699 A | * | 6/1984 | Strobl | F16B 21/082 |
| | | | | 411/510 |
| 6,299,397 B1 | | 10/2001 | Mengel | |
| 6,939,075 B2 | | 9/2005 | Walz | |
| 2004/0162560 A1 | * | 8/2004 | Raynor | A61B 17/7032 |
| | | | | 403/362 |
| 2020/0217345 A1 | * | 7/2020 | Liebelt | F16B 19/1081 |

FOREIGN PATENT DOCUMENTS

| | | |
|---|---|---|
| DE | 20 2016 102176 U1 | 5/2016 |
| RU | 2262620 C1 | 10/2005 |

\* cited by examiner

CONNECTOR FOR BUTT-CONNECTING TWO COMPONENTS

CROSS-REFERENCE FOR RELATED APPLICATIONS

This continuation application claims priority to PCT/EP2018/073602 filed on Sep. 3, 2018, which has published as WO 2019/068401 A1, and also the German application number 20 2017 106 045.4 filed on Oct. 5, 2017, the entire contents of which are fully incorporated herein with these references.

DESCRIPTION

Field of the Invention

The invention relates to a connector for butt-connecting two components, comprising two connector parts, in the form of U-shaped brackets, which can be pushed together into one another into a locked assembly position, according to the preamble of claim 1, and to an arrangement comprising such a connector.

Background of the Invention

A connector of this type has been disclosed, for instance, by DE 20 2016 102 176 U1.

Preferably, such connectors consist of plastic which is deformable in a resiliently elastic manner and which has comparatively good sliding characteristics. The connection can here made between wooden parts. A common (but not the only case) relates to the connection of two chipboards in a T-joint, wherein the chipboards have, except for the soft end faces, a hard surface, so that, in the T-joint, a soft end face abuts a hard surface. The connection is here created such that the necessary holes are drilled into the chipboards to be connected, the two U-shaped brackets of DE 20 2016 102 176 U1 in a preassembly position are inserted into the holes, and the chipboards to be connected are moved together, often by a blow, so that the U-shaped brackets are pushed into each other into the assembly position and are locked therein, whereby the two chipboards are fixed one against the other. The two bracket arms define an external diameter which, starting from the middle bracket arm on the rear plug-in portions, continuously increases up to an outer shoulder (edge scanning), the external diameter of which is greater than the drill hole diameter. When the chipboard is inserted into the hole, the conically configured, rear plug-in portions are compressed to the drill hole diameter, whereby the edge scanning disappears within the drill hole.

It has been shown, however, that the connecting forces which are necessary in the moving together of the two chipboards are very high, and the components to be connected are not always fixed to one another in a gap-free manner. It has further been shown that chipboards are often too soft to bring about a compression of the cone, above all on the end face. As a result, the connector remained conical, the edge scanning does not disappear, and the drill hole is radially impressed. However, this engenders a large force requirement in the connecting together of the chipboards, which has a negative effect on the practical application. In harder wood-based materials (for example MDF), the cone is partially compressed. It has been shown that this desired deformation of the connector, however, likewise calls for a large force requirement.

In contrast, it is therefore the object of the present invention, in a connector of the type stated in the introduction, to reduce the connecting forces and to nevertheless connect the components to one another always in a gap-free manner.

SUMMARY OF THE INVENTION

This object is achieved according to the invention by virtue of the fact that the outer sides of the rear plug-in portions are respectively configured as partial lateral surfaces of the same circular cylinder or, at least approximately, as partial lateral surfaces of the same circular cylinder. The rear plug-in portions thus have on their axial length the same or approximately the same diameter, wherein, in the latter case, cone angles of less than 2° lie still within the scope of the invention. Preferably, the two connector parts are of structurally identical configuration.

According to the invention, a cone of the rear plug-in portions is thus dispensed with, but rather the rear plug-in portions have on their axial length the same or approximately the same diameter, whereby the connecting forces are demonstrably reduced by up to 50%, which has a very positive effect on the practical application. Through the omission of the cone, the front plug-in portions at the free end are deformed significantly less. As a result of the up to 50% reduction in the connecting force, the components no longer have to be connected by a blow, but rather, according to the invention, a simple compression/pushing together is sufficient, which increases the user-friendliness.

Quite particularly preferably, the two outer bracket arms have on the outside, between the rear and the front plug-in portion, respectively a radially outwardly protruding supporting rib, which, when the front plug-in portion is plugged into a drill hole in the chipboard, acts as a depth stop. When the two chipboards are moved together, the supporting ribs are pressed into the soft end face of one chipboard, so that the two chipboards bear one against the other in a gap-free manner.

Advantageously, the front plug-in portions can have on the outside respectively at least one radially outwardly protruding nose, which protrudes less far than the supporting rib. As a result of the nose(es), the connector plugged into a drill hole no longer falls out of the drill hole and is therefore able to be pinned securely in place in advance.

Preferably, the front plug-in portions have on the outside a plurality of transverse ribs for pressing into the wall of the drill hole. At least the foremost transverse rib can here protrude less far outward than the rearmost transverse rib and thereby form an insertion aid when the front plug-in portion is plugged into a drill hole.

Preferably, the front plug-in portions have at their free ends, on the inside, respectively a recess, in order that, in the assembly position, there is sufficient room present for the middle bracket arm of the respectively other bracket, and hence, as far as possible, no increase in force arises in the course of the spreading.

In a preferred embodiment, the locking portions are formed by inner catches, which are provided on the inside respectively on the front plug-in portions, and by outer catches, which are provided on the outside respectively on the rear plug-in portions and/or on the middle bracket arm. In another preferred embodiment, the locking portions are formed by one or more latching springs, which are provided on the inside respectively on the front plug-in portions, and by a latching mechanism, which are provided on the middle bracket arm.

In an advantageous embodiment of the invention, the rear plug-in portions, at least on a partial length, have a longitudinal slot, in order to enable a spring action of the thereby generated two sides and to hereby achieve a lower connecting force in the expansion by the middle bracket arm.

The two brackets are plugged one into the other, mutually rotated through 90°, with the front plug-in portions of one bracket between the front plug-in portions of the respectively other bracket, beyond the subsequent assembly position, into a preassembly position, in which the front plug-in portions of one bracket protrude, in its plug-in direction, over the middle bracket arm of the respectively other bracket. In this preassembly position, the two brackets are pre-fixed relative to each other (transport safety) and, when the components are pushed together out of the preassembly position, are further pushed together into the assembly position.

Finally, the invention also relates to an arrangement comprising two mutually abutting components, and comprising a connector, configured as above, in its assembly position, wherein the front plug-in portions of the two brackets are inserted respectively in a drill hole of the components and are therein expanded respectively outward by the middle bracket arms of the pushed-together components and the two brackets are locked together.

Preferably, the drilling depth of at least one of the two drill holes corresponds to the length of the front plug-in portion of the inserted bracket, so that the bottom of the drill hole acts as a depth stop.

Further advantages of the invention emerge from the description, the claims and the drawing. Similarly, the aforementioned features and features which are yet to be further listed can be employed in isolation or in plurality in any chosen combinations. The shown and described embodiments should not be construed as a definitive listing, but rather have an exemplary character for the portrayal of the invention, wherein:

DETAILED DESCRIPTION OF THE PREFERRED EMBODIMENTS

In the following description of the figures, for same structural parts, or structural parts having the same function, identical reference symbols are used.

Figure 1A:
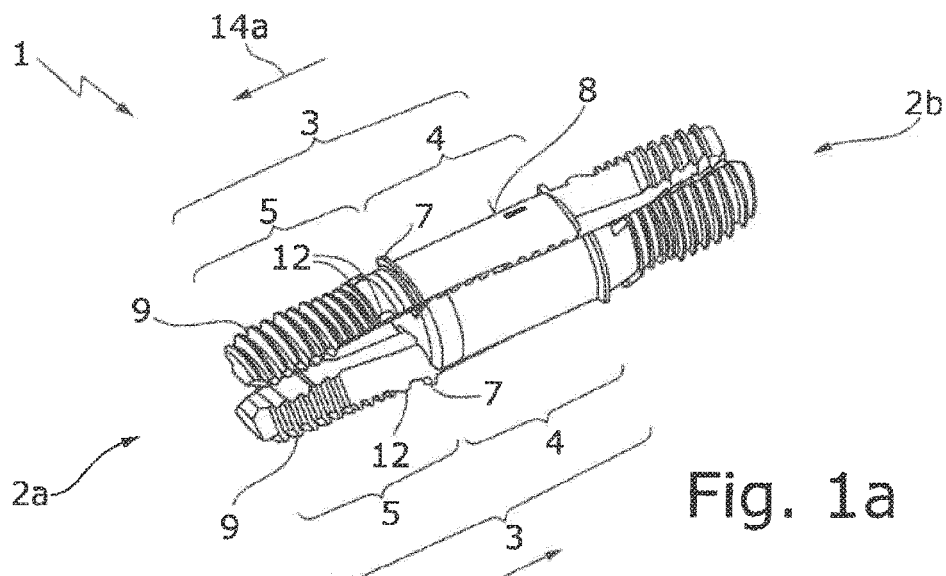
FIGS. 1a, 1b show two perspective views of the connector according to the invention comprising two structurally identical U-shaped brackets plugged one into the other into a preassembly position.
Figure 1B:
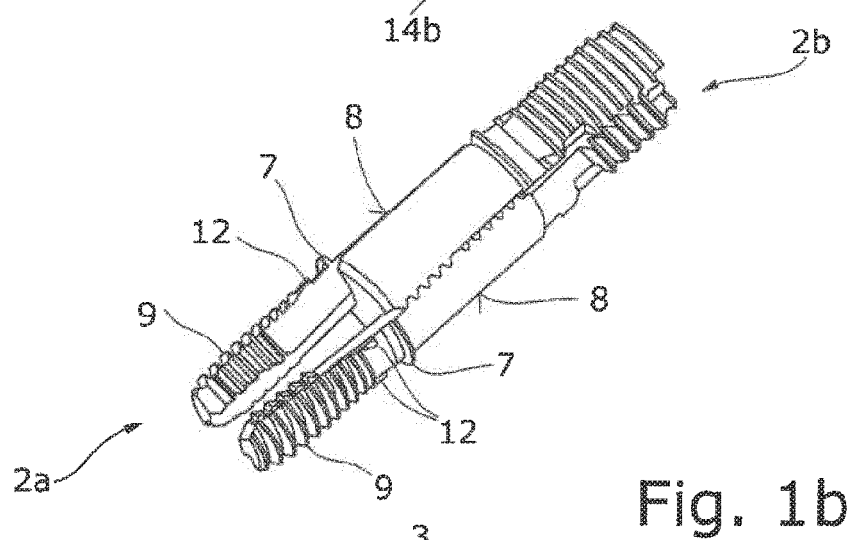

The connector 1 shown in FIGS. 1a and 1b serves for the butt-connecting of two chipboards 21a, 21b in a T-joint (FIG. 3), which chipboards respectively have a circular drill hole 22a, 22b. The chipboards 21a, 21b have, except for the soft end faces, a hard surface, so that, in the T-joint, a soft chipboard end face abuts a hard surface.

The connector 1 comprises two connector parts, in the form of U-shaped brackets 2a, 2b, which in the shown illustrative embodiment are of structurally identical configuration, but can also be of different configuration.

Figure 2:
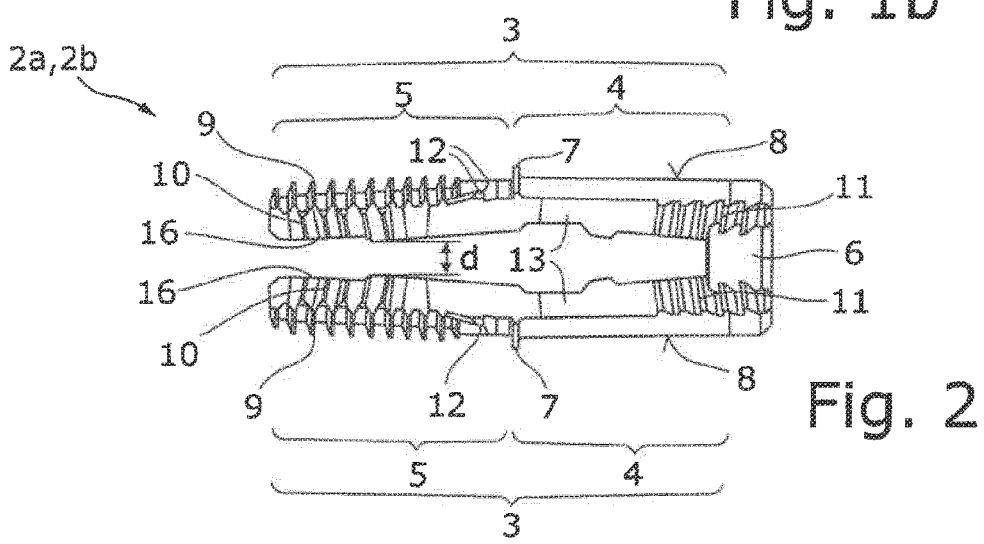
FIG. 2 shows a side view of one of the brackets shown in FIG. 1.

As shown in FIG. 2, the U-shaped bracket 2a, 2b comprises two outer bracket arms 3, having respectively a rear plug-in portion 4 and having a front plug-in portion 5 forming the free bracket end, as well as an interjacent middle bracket arm 6. The two outer bracket arms 3 have on the outside, between the rear and the front plug-in portion 4, 5, respectively a radially outwardly protruding, ring-segment-shaped supporting rib 7. The outer sides 8 of the rear plug-in portions 4 are respectively configured as partial surfaces of the same circular cylinder. The front plug-in portions 5 have, on their outer sides facing away from each other, a plurality of claw-like transverse ribs 9 and, on their mutually facing inner sides, a plurality of transversely running inner catches 10. The external diameter (outer spacing) of the three foremost transverse ribs 9 increases in the rearward direction to the greater external diameter of the rear transverse ribs 9, so that the foremost transverse ribs 9 serve as an insertion aid. The rear plug-in portions 4 have on their mutually facing inner sides a plurality of transversely running outer catches 11. Between the supporting rib 7 and the rearmost transverse rib 9, the front plug-in portions 5 have on the outside respectively two noses 12 at equal height, which protrude less far radially outward than the supporting rib 7. The thickness of the middle bracket arm 6 transversely to the direction of expansion of the two outer bracket arms 5 is greater than the clear distance d between the two mutually expandable front plug-in portions 5. Roughly at the height of the supporting ribs 7, the rear plug-in portions 4 have on the inside a latching groove 13.

Unlike as shown in FIGS. 1 and 2, the outer side 8 of the rear plug-in portions 4 can be provided with an optional fluting in order to achieve an additional retaining force in the drill hole.

With the front plug-in portions 5 facing each other and mutually rotated through 90°, the two brackets 2a, 2b are plugged one into the other, with the front plug-in portions 5 of one bracket 2a, 2b between the front plug-in portions 5 of the other bracket 2b, 2a, in the plug-in direction 14a or 14b—beyond the subsequent assembly position—into the preassembly position shown in FIGS. 1a, 1b. In this preassembly position, the front plug-in portions 5 of one bracket 2a, 2b protrude, in its plug-in direction 14a, 14b, respectively over the middle bracket arm 6 of the respectively other bracket 2b, 2a. In the preassembly position, the middle bracket arms 6 are engaged in the two latching grooves 13 of the respectively other bracket 2a, 2b, and thereby pre-fixed relative to each other and secured against being unintentionally pushed together.

Figure 3:
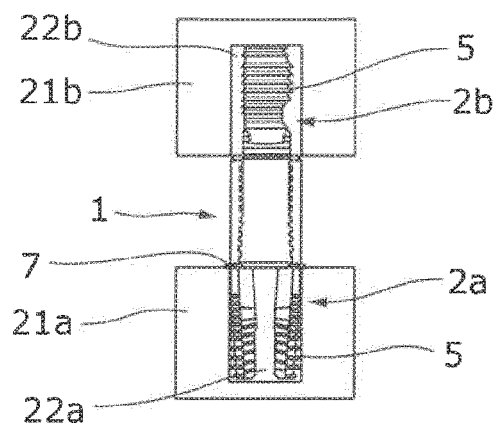
FIG. 3 shows the connector, shown in FIG. 1, in the preassembly position in the butt-connecting of two components.

As shown in FIG. 3, this pre-assembled connector 1 is firstly plugged with the two front plug-in portions 5 of one bracket 2a into the drill hole 22a of one chipboard 21a and then with the two front plug-in portions 5 of the other bracket 2b into the drill hole 22b of the other chipboard 21b, respectively to the point where the brackets 2a, 2b bear with their supporting ribs 7 against the chipboards 21a, 21b. The three foremost transverse claws 9 herein act as an insertion aid. In the surface drilling, the supporting rib 7 can be securely supported and forms a depth stop, since here the chipboard has a hard surface. In the softer chipboard end face, however, this support cannot take place, in which case the drilling depth must assume the supporting function in order to prevent the connector 1 from being pressed too far into the drill hole. The free ends of the front plug-in portions 5 herein press easily into the bottom of the drill hole. As a result of the noses 12, the connector 1 remains stuck in the chipboards 21*a*, 21*b*, so that the connector 1 is able to be pinned securely in place in advance and no longer falls out of the drill holes 22*a*, 22*b*.

Figure 4A:
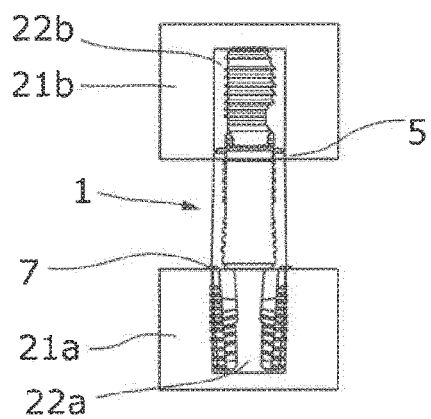
FIGS. 4a, 4b shows the connector, pushed together out of the preassembly position into an intermediate position, in the butt-connecting of the two components, respectively in two longitudinal sections rotated through 90°.
Figure 4B:
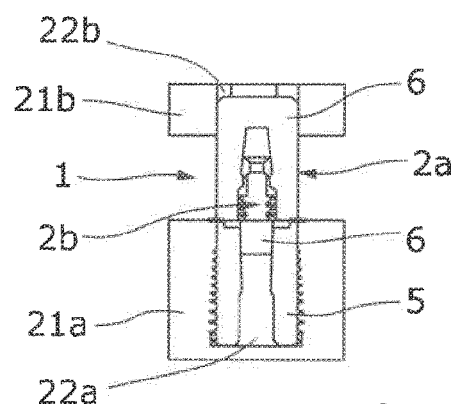

FIGS. 4*a*, 4*b* show the connector 1 pushed together out of the preassembly position into an intermediate position, in which the middle bracket arms 6 have passed out of the latching grooves 13 and passed into the drill holes 22*a*, 22*b* and hereupon expand the front plug-in portions 5 of the respectively other bracket. Due to their cylindrical outer sides 8, the rear plug-in portions 4 pass without force into the drill holes 22*a*, 22*b*.

Figure 5A:
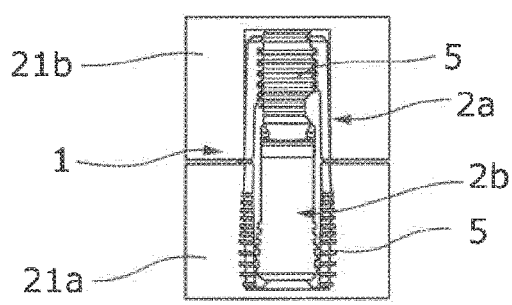
FIGS. 5a, 5b shows the connector, pushed together out of the intermediate position further into the assembly position, in the butt-connecting of the two components, respectively in two longitudinal sections rotated through 90°.
Figure 5B:
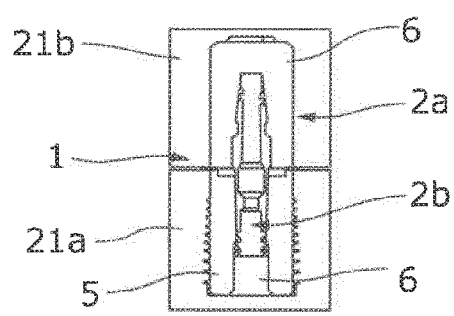

The two chipboards 21*a*, 21*b* are pushed together out of the intermediate position further, to the point of mutual contact, into their assembly position (FIGS. 5*a*, 5*b*). The two front plug-in portions 5 of one bracket 2*a*, 2*b* are here increasingly expanded by the middle bracket arm 6 of the respectively other bracket 2*b*, 2*a*, whereby the transverse ribs 9 are pressed into the wall of the drill hole 21*a*, 21*b*. In the assembly position, the inner catches 10 of one bracket 2*a*, 2*b* and the outer catches 11 of the respectively other bracket 2*b*, 2*a* engage in one another, whereby the two brackets 2*a*, 2*b* are locked together and are thus secured against being pushed back. The supporting ribs 7 are pressed into the soft end face of one chipboard, so that, unlike as shown in FIGS. 5*a*, 5*b*, no visible gap remains between the chipboards 21*a*, 21*b*, and thus the two chipboards 21*a*, 21*b* bear one against the other in a gap-free manner. The production tolerances of the drilling depth are compensated by the inner catches 10, which are located on four flanks of the brackets 2*a*, 2*b* and are respectively offset by, in the longitudinal direction, respectively a quarter of the slope in order to enable smallest possible steps.

Since the drilling depth acts as a stop, the free ends of the front plug-in portions 5 press on the end face somewhat into the bottom of the drill hole. This impression somewhat hinders the spreading of the front plug-in portions 5, in that the free ends are here bent somewhat inward again. In order that there is here no increase in force in the course of the spreading, the front plug-in portions 5 have on the inside respectively a recess 16 (FIG. 2) in order to create sufficient space for the middle bracket arm 6 of the respectively other bracket.

Figure 6:
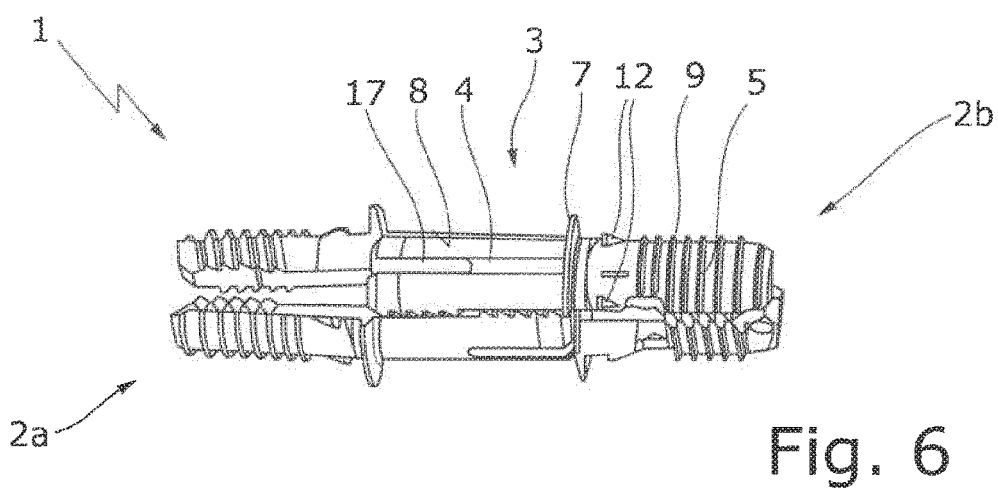
FIG. 6 shows a perspective view of a modified connector according to the invention.

As shown in FIG. 6, the rear plug-in portion 4 can have on a partial length (or even on the whole of its length) a longitudinal slot 17, in order to enable a spring action of the thereby generated two sides. This results in a lower connecting force, since there is no longer a need for spreading over the tip of the inner and outer catches 10, 11, i.e. no overexpansion occurs. Without the longitudinal slot, spreading must always respectively be realized over the tip of the inner and outer catches 10, 11, i.e. the effective spreading is less than the spreading which is required overall in the course of the joining.

Figure 7:
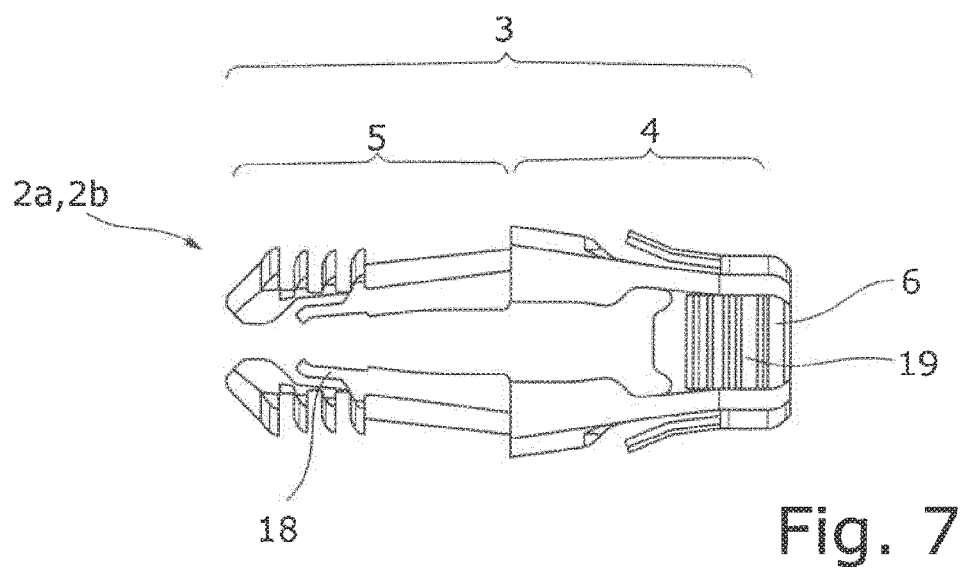
FIG. 7 shows a side view of a U-shaped bracket of a second embodiment of the connector according to the invention.

The bracket 2*a*, 2*b* shown in FIG. 7 differs from the bracket of FIG. 2 only by virtue of the fact that here, instead of the inner and outer catches, the front plug-in portions 5 have on the inside respectively one or more forwardly directed latching springs 18, and the middle bracket arm 6 has an external latching mechanism 19. In the assembly position, the latching springs 18 engage—similarly to the cable-tie principle—in the latching mechanism 19. Hence the connecting force likewise falls, since only the effective spreading is required; the latching mechanisms here engender no increase of the spreading or of the force. Here too, the latching springs 18 or the latching mechanism 19 can have latching portions which are mutually offset in the longitudinal direction, in order to be able to map smallest possible steps.

What is claimed is:

1. A connector for butt-joining two components, comprising:
    two connector parts which, mutually rotated through 90°, can be pushed together, into one another, into a locked assembly position and are in the form of U-shaped brackets having two outer bracket arms, which respectively have a rear plug-in portion for insertion into a circular drill hole of one component and an expandable front plug-in portion, forming a free bracket end, for insertion into a circular drill hole of the other component;
    a middle bracket arm for expansion of the two front plug-in portions of the respectively other bracket in the assembly position; and
    at least one locking portion for the mutual locking of the two brackets in the assembly position;
    wherein the outer sides of the rear plug-in portions are each configured as partial lateral surfaces of the same circular cylinder or, at least approximately, as partial lateral surfaces of the same circular cylinder;
    wherein the locking portions are formed by one or more latching springs, which on the inside are provided respectively on the front plug-in portions, and by a latching mechanism, which are provided on the middle bracket arm.

2. The connector as claimed in claim 1, wherein the two brackets are structurally identical.

3. The connector as claimed in claim 1, wherein the two outer bracket arms have on the outside, between the rear and the front plug-in portion, respectively a radially outwardly protruding supporting rib.

4. The connector as claimed in claim 3, wherein the front plug-in portions have on the outside respectively at least one radially outwardly protruding nose, which protrudes less far than the supporting rib.

5. The connector as claimed in claim 1, wherein the front plug-in portions have on the outside a plurality of transverse ribs.

6. The connector as claimed in claim 5, wherein at least the foremost transverse rib protrudes less far outward than the rearmost transverse rib.

7. The connector as claimed in claim 1, wherein the front plug-in portions have at their free ends, on the inside, respectively a recess.

8. The connector as claimed in claim 1, wherein the locking portions are formed by inner catches, which on the inside are provided respectively on the front plug-in portions, and by outer catches, which on the outside are provided respectively on the rear plug-in portions and/or on the middle bracket arm.

9. The connector as claimed in claim 1, wherein the rear plug-in portions, at least on a partial length, have a longitudinal slot.

10. The connector as claimed in claim 1, wherein the two brackets are plugged one into the other, mutually rotated through 90°, with the front plug-in portions of one bracket between the front plug-in portions of the respectively other bracket, beyond the subsequent assembly position into a preassembly position, in which the front plug-in portions of one bracket protrude in its plug-in direction over the middle bracket arm of the respectively other bracket, and in that the two brackets are slidable out of the preassembly position back into the assembly position.

11. An arrangement comprising two mutually abutting components and a connector, located in the assembly position, wherein the connector comprises:
   two connector parts which, mutually rotated through 90°, can be pushed together, into one another, into a locked assembly position and are in the form of U-shaped brackets having two outer bracket arms, which respectively have a rear plug-in portion for insertion into a circular drill hole of one component and an expandable front plug-in portion, forming a free bracket end, for insertion into a circular drill hole of the other component;
   a middle bracket arm for expansion of the two front plug-in portions of the respectively other bracket in the assembly position; and
   at least one locking portion for the mutual locking of the two brackets in the assembly position;
   the outer sides of the rear plug-in portions being each configured as partial lateral surfaces of the same circular cylinder or, at least approximately, as partial lateral surfaces of the same circular cylinder, and
   wherein the front plug-in portions of the two brackets are inserted respectively in a drill hole of the components and are therein expanded respectively outward by the middle bracket arms of the pushed-together components and the two brackets are locked together;
   wherein the locking portions are formed by one or more latching springs, which on the inside are provided respectively on the front plug-in portions, and by a latching mechanism, which are provided on the middle bracket arm.

12. The arrangement as claimed in claim 11, wherein the drilling depth of at least one of the two drill holes corresponds to the length of the front plug-in portions of the inserted bracket.

13. The arrangement as claimed in claim 11, wherein the two components are two chipboards.

* * * * *